United States Patent [19]

Zobel

[11] 4,049,326
[45] Sept. 20, 1977

[54] FAIL SAFE CIRCUIT FOR AN ANTI-SKID CONTROL APPARATUS

[75] Inventor: Don W. Zobel, Tempe, Ariz.

[73] Assignee: Motorola, Inc., Schaumburg, Ill.

[21] Appl. No.: 631,804

[22] Filed: Nov. 14, 1975

[51] Int. Cl.² .............................................. B60T 8/08
[52] U.S. Cl. ..................................... 303/92; 340/52 B; 340/248 A; 340/248 C
[58] Field of Search ........................ 303/21 AF, 92; 307/10 R, 235 R; 317/5; 324/51; 328/146, 148; 340/52 B, 53, 248, 253, 409, 412; 361/238

[56] References Cited

U.S. PATENT DOCUMENTS

| 3,311,907 | 3/1967 | Teal | 340/248 C |
| 3,457,560 | 7/1969 | McKinley | 340/248 C |
| 3,578,819 | 5/1971 | Atkins | 303/21 AF X |
| 3,734,573 | 5/1973 | Davis et al. | 303/21 AF X |
| 3,786,501 | 1/1974 | Marnerakis | 340/248 A X |
| 3,866,979 | 2/1975 | Rabus et al. | 303/21 AF |
| 3,874,743 | 4/1975 | Fleischer et al. | 303/21 AF |
| 3,920,284 | 11/1975 | Lane et al. | 303/92 |
| 3,930,688 | 1/1976 | Rau et al. | 303/21 AF X |
| 3,951,467 | 4/1976 | Fleagle | 303/92 X |
| 3,966,267 | 6/1976 | McNinch, Jr. et al. | 303/92 X |

*Primary Examiner*—Stephen G. Kunin
*Attorney, Agent, or Firm*—Eugene A. Parsons

[57] ABSTRACT

Fail safe circuitry of an anti-skid control apparatus for a brake system of a motor vehicle. The fail safe circuitry is rendered in a monolithic integrated circuit chip and includes apparatus for sensing the power consumed by said chip and apparatus for decoupling said chip from the power source for preventing its thermal destruction when the power consumed reaches a predetermined level. The chip also includes apparatus for precisely timing the time duration of a brake release provided by the anti-skid control apparatus and generating a latch signal to disable said anti-skid control apparatus to limit the brake release duration within a predetermined time duration.

2 Claims, 3 Drawing Figures

FAIL SAFE CIRCUIT FOR AN ANTI-SKID CONTROL APPARATUS

FIELD OF THE INVENTION

This invention relates to fail safe circuitry for an anti-skid control apparatus and, more particularly, to improved fail safe circuitry for controlling the operation of the anti-skid control apparatus in a precisely timed manner despite the fluctuations in the voltage level of the power supply for the anti-skid control apparatus.

BACKGROUND OF THE INVENTION

Enormous resources and money have been committed to developing anti-skid control apparatus for automobiles and fail safe circuitry for the apparatus in recent years, and, as a result, some significant improvements have been made. According to the prior art, an anti-skid control apparatus is designed to work with the brake system of motor vehicles under the control of the operator. Typically a brake system includes a brake pedal, a hydraulic cylinder, a valve, an auxiliary cylinder and brake shoes operatively connected in series in a conventional manner so that when the operator applies a brake force by pressing the brake pedal, the force is transmitted through the hydraulic cylinder, the valve and thence to the auxiliary cylinder to force the brake shoes against the brake drum to slow down the vehicle. The vehicle tends to skid either when the road is slippery or when the brake is applied too forcefully so that the deceleration rate of the wheel is faster than the road surface condition would allow to roll without skidding. Typically, the anti-skid control system is designed to include means for sensing the deceleration or reduction in the rotational speed of the wheel and generate an 'anti-skid' signal when the rate of deceleration exceeds a given rate, for example, 1 g. The "anti-skid" signal is then utilized by the anti-skid control apparatus for deactuating the valve so that the valve in turn deactuates the auxiliary cylinder and enables it to release the brake, and thereby allow the wheel to roll without braking.

The prior art anti-skid control apparatus includes a coil for actuating and deactuating the valve. The anti-skid control apparatus utilizes the "anti-skid" signal to energize the coil, and thereby operate the valve. Once energized, the coil causes the valve to release the auxiliary cylinder. In turn, the auxiliary cylinder releases the brake shoes and this causes the tire to rotate again without braking action. As the tire picks up speed again and the deceleration rate decreases below the predetermined minimum level, the "anti-skid" signal is removed from the anti-skid control circuitry. In turn, the anti-skid control circuitry removes the "anti-skid" control signal from the coil and thereby actuates the valve. At this point if the operator is still applying brake, the braking force from the brake pedal applied by the operator is allowed to go through the hydraulic cylinder and valve, and thence to the auxiliary cylinder, and allow the brake shoes to engage against the drum again. In this manner, the braking action is put under the control of the operator again.

In effect, the anti-skid control apparatus is designed to remove intermittently the valve control away from the operator when the deceleration rate of the wheel exceeds a predetermined level signifying skidding conditions. Thus the anti-skid control apparatus is designed to interrupt in a controlled manner the manual braking operation provided by the operator so as to minimize skidding of the vehicle.

Typically, the anti-skid control apparatus is made up of electrical circuitry which utilizes the power supply (i.e., battery) of the automobile and voltage regulator which converts the output of the battery into a voltage level usable by the anti-skid control circuitry. In actuality, the battery voltage is very rarely stable and tends to vary significantly depending upon the age of the battery and the amount of usage. The batteries tend to vary from unit to unit in terms of their output voltage level. The voltage regulator is designed to generate a stable output for use by the anti-skid and other circuitry.

However, the output of the voltage regulator is found still subject to change in amplitude as the voltage amplitude of the power supply varies. The variation in the voltage amplitude of the output of the voltage regulator has been found to affect adversely the reliability of the performance of the anti-skid control circuitry of the anti-skid control apparatus. This renders the anti-skid control apparatus less reliable. Also it has been found that none of the anti-skid control circuitry have been provided with very reliable fail safe features for its fail-safe operation.

SUMMARY OF THE INVENTION

It is an object of the present invention to provide an improved anti-skid control apparatus.

It is another object of the present invention to provide an improved fail safe circuitry for the anti-skid control apparatus to assure safe operation of the brake system and in particular to prevent the anti-skid control circuitry from taking over the brake system and locking the brake system out for more than a given time duration of what is deemed a safe period.

It is yet another object of the present invention to provide reliable fail safe circuitry for the anti-skid control apparatus.

It is still another object of the present invention to provide fail-safe circuitry in a monolithic integrated circuit chip with means designed to prevent its thermal destruction due to an excessive amount of current that may be drawn by the anti-skid control circuitry and the fail-safe circuitty.

It is a further object of the present invention to provide fail-safe circuitry which senses the level of power supplied to the anti-skid apparatus from the DC power supply falling outside an acceptable range and deactivates the anti-skid control apparatus to render the brake system more fail safe.

The foregoing and other objects are attained in accordance with the present invention by providing an anti-skid control system that includes means for sensing the deceleration of the automobile wheel and generating an "anti-skid" signal upon detection of the deceleration rate exceeding a predetermined rate signifying the skidding condition of the wheel, anti-skid control circuitry responsive to the "anti-skid" signal for actuating the brake valve and thereby releasing the brake shoes in a controlled manner and fail safe circuitry for preventing the anti-skid control circuit from releasing the brake shoes for more than a predetermined time period to render the brake system and the anti-skid control apparatus fail safe.

It is another feature of the present invention to provide fail safe circuitry in a monolithic integrated circuit that includes various means designed to provide certain fail-safe functions, such as rendering the anti-skid control circuitry inoperative, if a power supply level applied thereto from the DC power source (i.e., battery) falls outside an acceptable range and removing power supply from the anti-skid control circuitry and the fail safe circuitry itself, if the power supply applied thereto reaches an unacceptable level that would otherwise cause thermal "burn-out" of the electrical components making up the circuitry.

DETAILED DESCRIPTION

Figure 1:
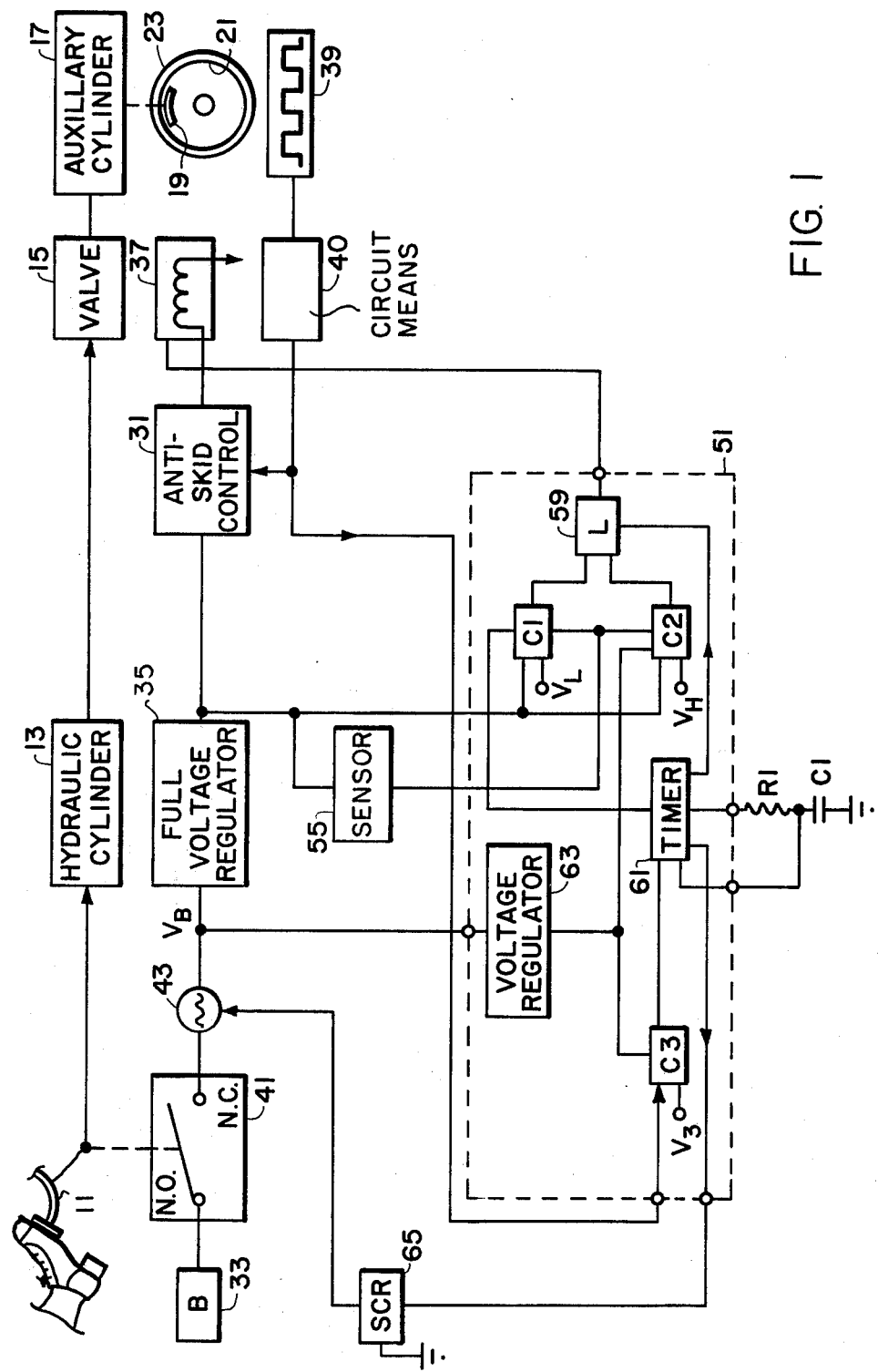
FIG. 1 shows a functional block diagram of the anti-skid control apparatus of the present invention in combination with a brake system.

Referring to FIG. 1, there is shown a simplified schematic functional block diagram of the brake system. It includes brake pedal 11, hydraulic cylinder 13, valve 15, an auxiliary cylinder 17, a brake shoe 19 disposed and configured to engage against the drum 21 of a wheel 23. The brake pedal, the hydraulic cylinder, the valve and auxiliary cylinder 17 are operatively designed and coupled so that, when an operator applies a force downward against the brake pedal 11, that force is transmitted via the hydraulic cylinder 13, the valve 15 and the auxiliary cylinder 17 to the brake shoes 19. In response, the brake shoes 19 are brought into engagement against the drum 21 of the wheel 23. So far what is described is conventional and well known.

As the brake force is applied against the drum 21 the tire slows down, that is, its rotational speed decelerates. The rate at which the vehicle decelerates depends on a number of factors, such as the road surface conditions, the amount of brake force applied and the speed of the automobile at the time brake is applied. The higher the brake force applied against the drum 21, generally the higher the deceleration rate will be. The higher the speed with which the automobile is traveling at the time, the greater the brake force required to slow down the vehicle. If the deceleration rate of the wheel is higher than the rate with which the speed of the vehicle can decelerate relative to the ground, then skidding takes place between the wheel and the ground. Many factors cause the vehicle skid: slipperiness of the ground, condition of the tire surface, the amount of brake force applied and many other factors cause the vehicle to skid. Interplay among these factors is rather complex and it is hard to determine the nature and degree of their effect in causing the vehicle to skid. As a practical approach, industries have established by statistical and experimental processes that if the wheel decelerates any faster than a certain level, for example, 1 g, i.e., 32 ft/sec/sec/, then the vehicle usually skids. The anti-skid control apparatus utilizes this phenomenon in obtaining the "anti-skid" control signal.

The anti-skid control apparatus includes suitable means for sensing the deceleration rate of the wheel; the sensing means is usually positioned to sense the rate of change in speed. When the rate reaches a certain given rate, for example, 1 g or 32 ft/sec/sec, conventional circuit means is used to generate a signal that can be used to provide anti-skid control. The manner in which the anti-skid control signal is derived and utilized by the anti-skid control approach shall be described now.

Referring to FIG. 1, there is shown an anti-skid control apparatus which includes a battery 33, a switch 41, a fuse 43, a full voltage regulator 35, an anti-skid control circuit 31, and valve control coil 37 for the valve 15. The anti-skid control circuitry 31 is powered by the power supplied from the automobile battery 33 via switch 41, fuse 43 and voltage regulator 35. The circuit 31 is of a conventional type that provides a control signal to the coil 37 for controlling the valve 15. The control apparatus also includes sensing means 39 of a conventional design which senses the rate of change of speed, in particular, the deceleration rate of the automobile wheel 23. Circuit means 40 receives the deceleration signal and generates an output signal if the deceleration signal from the sensing means 39 indicates the rate of the deceleration exceeds a certain predetermined level such as one g. In response to this signal, the anti-skid control circuitry 31 provides an output signal which causes the coil 37 to energize. In return, the energized coil 37 causes the valve to deactuate; this, in turn, causes the valve to release the auxiliary cylinder 17. In turn, the auxiliary cylinder 17 releases the brake shoes 19. Once released from the shoes, the wheel 23 begins to accelerate.

Thus, the anti-skid control circuitry is used to take over the braking operation in a controlled manner from the operator as the deceleration exceeds a certain predetermined level. In particular, the anti-skid control circuitry takes over the brake control function otherwise provided if a skidding condition is present. In operation, suppose the operator continues to apply the brake force, i.e., press the brake pedal 11, and causes the brake force to be transmitted to the brake shoes 19 via the hydraulic cylinder 13, the valve 15 and the auxiliary cylinder 17. In turn, the wheel slows down. As the operator presses down the brake pedal, the switch 41 coupled mechanically thereto in a normally open position (N.O.) closes also. This causes the battery to supply power to the full voltage regulator 35 via the fuse 43. As long as the brake pedal 11 is pressed downward, the switch 41 is closed and the anti-skid control circuitry is energized. The anti-skid control circuitry generates an output signal only when the deceleration rate exceeds the certain predetermined rate. So long as the wheel decelerates at a rate less than the predetermined rate the anti-skid control circuitry does not serve any function. When the rate is exceeded, it provides the output signal which causes the coil 37 to energize and thereby deactuate valve 15 and cause the auxiliary cylinder to release the brake shoes. The anti-skid control circuitry 31 is of a design that removes its output as the deceleration rate decreases back to below the predetermined level and then actuates the valve 15. This in turn permits the operator to have control over the braking operation, i.e., permits him to apply the brake force via the hydraulic cylinder 13, the valve 15, the auxiliary cylinder 17 and brake shoes 19 against the drum 21.

In short, the anti-skid control circuitry operates in conjunction with the brake system operated by the driver and takes over the braking function and releases the brake, if a skid condition exists. Should the deceleration of the wheel increase above the certain predetermined level and the drive continue to pres the brake pedal down into the brake position, then the anti-skid control circuitry takes over the brake control function and releases the brake. If the operator releases the brake pedal then the anti-skid control circuitry also is removed from the picture in that the switch 41 opens and de-energizes the circuit.

In accordance with an aspect of the present invention, there is provided fail safe circuitry for use in conjunction with aforedescribed brake system the and anti-skid control circuitry and apparatus. Referring to FIG. 1, there is shown fail safe circuitry 51 in a functional or schematic form. Advantageously, the various functional elements of the fair safe circuitry shown within the fail safe circuit block 51 defined by a dotted line and as described in detail hereinbelow is constructed in single monolithic integrated chip circuitry using a conventional circuit fabrication technique.

Functionally stated, the fail safe circuitry is designed to serve the following functions: It is designed to include sensing means made of comparators C1 and C2 which sense whether or not the power supply, that is, the battery 33 provides an acceptable range of power as sensed at the output of the voltage regulator 35 interposed between the battery and the anti-skid control circuitry. If the power supply falls either below a certain predetermined low level or exceeds above a certain high level, then the sensing means generates an output signal to actuate a latch 59. The actuated latch, in turn, provides a latch signal to the coil 37. The latch signal is used as a means to disable the coil 37 and cause it to be non-responsive to the output of anti-skid control circuit 31.

In effect the anti-skid control apparatus is prevented from providing its anti-skid control function. In other words, the fail safe circuitry allows the anti-skid control circuitry to function only if the battery power level applied to the anti-skid control circuitry is within an acceptable range in which the anti-skid control circuitry may operate reliably. And the fail-safe circuitry disables the anti-skid control circuitry if the power is outside the acceptable range and causes the anti-skid control circuitry to be unreliable and thereby reverts the brake control entirely back to the driver.

Still another function the fail safe circuitry is designed to serve is to deactuate the anti-skid control circuit after a fixed given time period, i.e., it times out the operation of the anti-skid control circuit under the control of the operation and puts the manual control back into effect when the time duration of the anti-skid control signal reaches a certain predetermined period. This is accomplished by timing circuitry, or in short, a timer 61 provided in the fail-safe circuitry. In particular, when the deceleration rate sensed by the sensing means 39 is found to exceed the predetermined level, the timing circuit begins timing the time duration of the deceleration signal output from circuit means 40 indicating the rate exceeding the predetermined rate. After a predetermined time duration of continuous presence of the excessive rate, the timer causes the latch circuit 59 of the chip to provide an output signal to the coil 37. In turn, coil 37 is de-energized to allow the normal braking action of the operator via the brake pedal 11, the hydraulic valve cylinder 13, valve 15 and auxiliary cylinder 17 to resume and take effect.

According to another aspect of the present invention the fail-safe circuitry is designed to be insensitive to the fluctuation in the voltage level of the power supply, if it falls within the acceptable range determined by the comparators C1 and C2. The timing provides the precisely predetermined time duration control in such a way that anti-skid control circuitry is prevented from acting against the control of the brake system by the driver only if the anti-skid control signal lasts longer than the predetermined time period, for example, four seconds.

Figure 3:
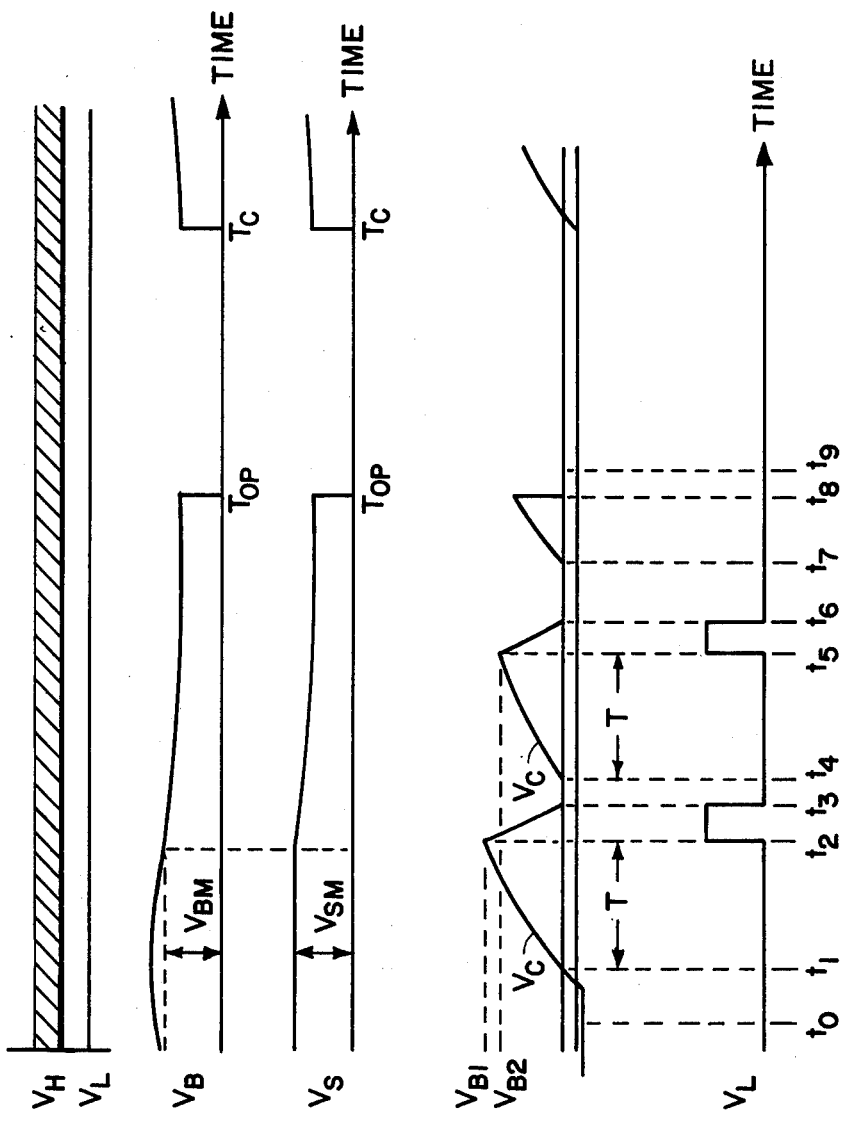
FIG. 3 shows the timing diagram helpful to the understanding of the operation of the present anti-skid control apparatus and fail safe circuitry.

Referring to FIG. 1 more specifically, the aforementioned functions are provided in a monolithic integrated circuit shown within dotted line box 51. As shown, the circuit includes first and second comparators C1 and C2 for comparing the output of the full voltage regulator 35 with a certain low reference voltage $V_L$ (FIG. 3) and certain high reference voltage $V_H$ (FIG. 3). The comparators are energized into operative state by the voltage applied thereto by a voltage sensor 55 which senses the voltage applied thereto by the full voltage regulator 35. The low and the high level reference voltages $V_L$ and $V_H$ are chosen to represent the lower and upper limit of the voltage range of the output of the voltage regulator for safe operation of the anti-skid control circuit 31 and the fail-safe circuit. The latch circuit 59 is provided to latch when the comparators C1 and C2 sense that the output of regulator is too high or too low respectively. Once latched, the latch circuit 59 provides a latch signal which deenergizes the coil 37. In turn the valve 15 is released from the coil 37 and placed under the control of the operator via the pedal 11 and the hydraulic cylinder 13. Stated in other words, the comprators C1 and C2 monitor the power supply for the anti-skid control circuitry and if the power supply falls below a certain acceptable level or exceeds above a certain acceptable level, then the comparators C1 and C2 provide an output latch signal for removing the operation of the anti-skid control circuitry and returning the braking operation to the operator. Thus, the fail-safe circuitry makes the manual brake system fail safe in the sense that it prevents interference by the anti-skid control circuitry in the operation of the brake system by the operator when the power supply falls outside the acceptable range.

Referring to the time out feature of the fail-safe circuitry, as illustrated in FIG. 1, the fail-safe circuitry includes timer 61, a third comparator C3 and a voltage regulator 63. These circuit elements in the fail-safe chip are designed to work with an RC time constant circuitry, R1 and C1, externally provided thereto to time the operation of the anti-skid control as follows. The timing circuitry prevents the anti-skid control from taking over the operator's brake control function for more than a given continuous time duration, for example, four seconds. Referring specifically to the circuit, the voltage regulator 63 is of a design that converts the output of the battery to a certain voltage level usable to energize the comparators C1, C2 and C3, the timer circuit and other circuits. The regulator 63 provides a desired DC bias supply for the various semiconductor circuit elements of the functional circuit elements shown in the fail-safe chip circuit.

The timing essentially is designed to provide the time out signal by the time constant established by the resistor and capacitor R1 and C1. It begins to time in response to an output from C3 which senses the start of the output of the skid-sensing circuit at the circuit means 40, indicating the deceleration rate has exceeded the certain predetermined level sensed by the sensing means 39. C3 compares the output of the circuit means 40 with a reference voltage V3 of a certain predetermined level referenced to the excessive deceleration, and provides an output signal which causes the timer 61 to time the time duration of the excessive deceleration rate. As the time exceeds a certain predetermined time interval, as set up by the resistor R1 and capacitor C1, the timer causes an output signal to be sent out to the latch 59. Latch 59 in turn provides a latch signal to deactuate the coil 37 and thereby prevent the coil 37 from interferring with the operation of the brake valve 15 by the operator in controlling the braking operation.

In short the timer is used to return the brake system to the direct control of the operator, if and when the interruption by the anti-skid control circuitry of the normal operator control of the braking operation reaches the predetermined time duration.

The timer is used to generate a signal for blowing the fuse 43 via suitable switching means such as an SCR 65. The SCR switch causes the fuse 43 to blow and open the path therethrough to remove the power supply from the anti-skid control circuitry as well as the fail safe circuitry and put them out of commission. This circuitry is used to deactivate positively the entire anti-skid system so that, in case of a system malfunction, control is returned to the operator and that there is no way control can be taken from the operator. The timer applies the firing signal to the SCR 65 at a fixed duty cycle, such as 10%, to limit the power consumption in case the SCR doesn't fire.

Figure 2:
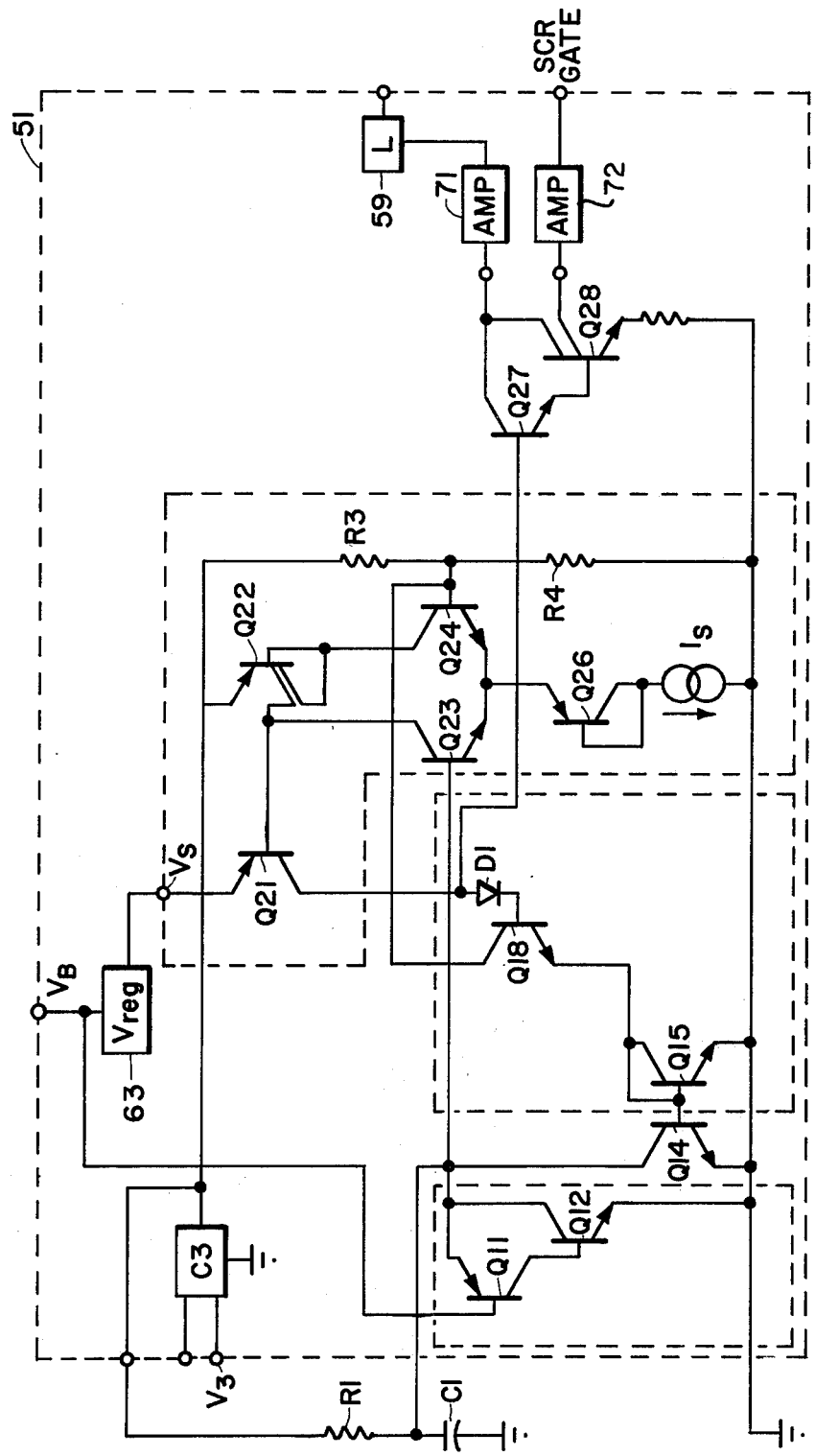
FIG. 2 shows the fail safe circuitry in accordance with the present invention in a schematic form.

FIG. 2 illustrates in a schematic form certain details of the timing circuitry of the fail safe circuitry 51 shown in FIG. 1. FIG. 3 shows timing waveform helpful in the understanding of the operation of the fail safe circuitry. The timing circuitry comprises RC circuit, R1, C1.

Internally within the fail-safe circuitry chip, there are provided various active elements Q11, Q12 . . . Q27 and Q28, a constant current source I, a diode D1 and resistors R3 and R4, comparator C3 and voltage regulator 63, which are operatively coupled to function with R1 and C1 in providing the timeout function. Generally stated, the active elements Q11 through Q26 and the resistors R3 and R4 and diode D1 are configured to provide a precise control of the up-ramping and down-ramping or charge and discharge of the timing circuitry R1 and C1. The voltage regulator 63 obtains the voltage for the fail safe circuit chip from the output of the battery applied thereto via the fuse 43 as illustrated in FIG. 1. The output of the voltage regulator 63 provides the voltage supply $V_S$ to energize the various active elements into operative states. The timing circuitry is rendered operative only when voltage regulator 63 provides necessary voltage. This takes place when the operator puts the brake on and the switch 41 is thereby closed. Otherwise the timing circuitry is rendered inoperative and is prevented from interferring with the braking operation of the brake system by the operator.

The fail safe circuitry includes active elements Q11 and Q12 operatively connected in the manner shown for discharging charged capacitor C1 when $V_B$ goes below the voltage on C1. $V_B$ is relatively high after the operator puts the brake on and this goes on until the operator releases the brake, for example, at $t_{op}$ as illustrated in FIG. 3, $V_B$. At $t_{op}$ $V_B$ goes low or zero as the switch opens, i.e., as the operator releases the brake. The voltage regulator 63 is of such a design that its output, $V_S$, follows generally the voltage wave amplitude of the battery, $V_B$ except that the maximum output level, $V_{SM}$, of the regulator 63 is fixed at a level to assure that the power supplied to the fail safe circuit 51 does not exceed a predetermined level to cause the circuit burn-out. So relatively compared, the wave form for $V_S$ follows $V_B$ except where for the portion of battery voltage which exceeds the $V_{BM}$ level corresponding to $V_{SM}$, its output $V_S$ is thus maintained at the maximum level, $V_{SM}$.

Although not shown, $V_S$ is susceptible to high level noise signals such as sparks and other extraneous signals propagating through the regulator to the chip caused by the electrical system of the automobile so that the voltage regulator 63 output $V_S$, goes to zero and thus cause Q11 and Q12 to discharge C1.

The loss of the voltage supply to the voltage regulator 63 cuts off the voltage supply for the timing circuitry of the fail safe chip 51, as illustrated between $t_{op}$ and $t_c$ in FIG. 3.

In the timing circuitry, FIG. 2, the active element Q21 is used as a switch which is driven by switching circuit driver means comprised of active elements Q22, Q23, Q24, Q26 and diode means D1 operatively connected to function as a differential amplifier. The output of the switch Q21 is applied to an active element Q27 and the output of Q27 is amplified by an amplifier 71 and then applied to the latch 59. The output of the switch Q27 is also applied via another active element Q28 operatively connected as shown to provide an output signal to an amplifier 72, and thence to the SCR 65 for blowing the fuse if the comparator C3 detects that the coil 37 has remained energized longer than a predetermined time duration.

The timing circuitry is designed so that the charge and discharge duration is proportioned to the variation in the output level of $V_S$ while it is being generated normally and is applied to the fail-safe circuitry so that the charge time up to the level where C1 begins to discharge is of fixed duration. Active elements Q23 and Q24 form a comparator and are arranged in a conventional manner to toggle back and forth depending upon the potential applied to the base electrodes thereof. The active element Q22 serves the function of equalizing the amount of the current drawn by the active elements Q23 and Q24 as they conduct to balance their operation. Active element Q26 and constant current source $I_S$ form a current supply for the active elements Q23 and Q24 in a conventional manner. The Q21 used as the switching element uses the collector current of the Q23 to provide the switching function.

The active elements Q14, Q15, and Q18 are operatively connected as shown to serve the functin of starting the discharge of the capacitor C1 in a controlled manner as follows. In operation, normally, Q23 is off. The comparator C3 senses the start of the deceleration rate exceeding a certain predetermined rate. The comparator C3 compares this signal with a reference voltage $V_3$ and provides an output. In return the capacitor C1 begins to charge.

The rate at which the capacitor C1 charges is fixed by the RC timing constant formed by R1 and C1 and $V_S$. As the voltage increases to a certain point, Q23 is turned on. As the current through the collector of Q23 reaches a certain level or the balancing point the switch Q21 is turned on. In turn, Q21 causes Q15, and Q18 to turn on. This establishes a certain base potential at the base of Q14. Now the potential established at the base of Q14 determines the discharge time by inducing a current in Q14. The discharge of the capacitor C1 takes place when Q14, Q15, and Q18 begin to conduct and the discharge ramp time is controlled by the RC time constant formed by resistor R3 and capacitor C1. The reason that the active element merely serves the function of a switch is that the current caused by Q21 dissipates through the parasitic device in Q18's base and does not interfere with the down ramp timing.

The active elements Q11 and Q12 serve the function of discharging the capacitor C1 to prevent the fail safe circuitry from interferring with the operation of the anti-skid control circuitry when $V_B$ dips below the voltage on C1 before it has charged to the predetermined level set by the predetermined time duration, for example, 4 seconds. In other words, the fail safe circuitry is designed so that when the predetermined tolerable maximum time duration of the deceleration rate exceeding the predetermined rate is less than the predetermined time duration, for example, 4 seconds then the timer should be returned to its initial state. Referring to FIG. 3 $V_S$, $V_L$, and $V_C$ this means that when the charge time lasts four seconds, the latch signal $V_L$, is generated during the discharge following the charge. This is shown with two pulses, $V_L$, in FIG. 3 between the time $t_2$ to $t_3$ and $t_5$ to $t_6$. When the charge time is less than the given time, T, then no latch signal, $V_L$, is generated, as illustrated with $V_L$ during the time period $t_8$ and $t_9$. In substance as illustrated while the excessive deceleration takes place, the capacitor C1 charges regardless of whether or not it lasts the predetermined time period. It discharges when the excessive deceleration stops, and is made ready to charge again and the latch signal is generated only when the time duration reaches the predetermined time duration, T. Q11 and Q12, Q14 serves the function of discharging the timing capacitor C1. The discharge of the capacitor C1 takes place through Q11 and Q12 which sense a sudden ripple or the sudden drop of the power supply and cause a discharge of the capacitor C1. This is accomplished by the fact that the base potential of Q11 is decreased when there exists a negative ripple or sudden drop off of the voltage $V_B$ which causes Q11 to forward bias and conduct and this causes Q12 to conduct and in turn Q12 drains the charge stored in the capacitor C1 and returns it to a discharged state.

The operation of the fail safe circuitry, will be described with reference to timing waveforms shown in FIG. 3. Initially, assume that the automobile is in motion and the operator wants to slow down and applies the brake by pressing the brake pedal 11 downward. While the pedal is down the switch 41 closes and connects the power supply to the full voltage regulator 35 for the anti-skid control circuit 31 and the voltage regulator 63 for the fail safe circuit 51 and energizes the anti-skid control circuitry 31 and enables the comparators C1 and C2 via sensor 55.

Now suppose the operator presses the pedal real hard at time T₁, and causes the wheel to decelerate above the predetermined rate. This is sensed by the comparator C3 by comparing the output signal level of the coil drive from anti-skid control 31 with a reference voltage $V_3$. With the comparator C3 generating an output indicating the start of the deceleration rate at time T1, the capacitor C1 begins to charge.

Now as the deceleration continues to exceed, the capacitor C1 continues to charge. Now at this point Q23 is nonconductive and Q24 is conductive, since the base potential at Q23 determined by the capacitor C1 has not reached enough potential level to forward bias Q23. Q23 becomes conductive as it reaches a level determined by R3, R4, and $V_S$ where Q23 is forward biased at time $t_2$ by the charge on C1. The base potential of Q24 is established by the potential divider R3 and R4 which divides the potential supply $V_S$. Once Q23 is made conductive, then Q21 switches into a conducting state. In turn, the active elements Q15, and Q18 are made to conduct by the forward biasing action of the current from Q21 applied to the active element Q18 via diode D1. As soon as Q15 conducts, Q14 becomes conductive also and the capacitor C1 discharges through Q14. The rate at which the capacitor C1 is discharged through Q14 is much faster than the rate at which it is charged via R1. During this discharge interval the output of the switch Q21 is applied to the active element Q27 in the form of a latch pulse signal as indicated in the form of a pulse wave $V_L$ in FIG. 3. This latch signal is amplified by the amplifier 71 and applied to the latch circuit 59. The latch circuit in turn latches the coil 37 and renders it inoperative.

The time duration of the charging interval by capacitor C1 is fixed by the R1, C1 time constant and this in effect fixes the predetermined time duration that the fail safe circuit is designed to sense, the time duration during which the deceleration exceeds the predetermined rate. This time duration T for example, is fixed even though the power provided by the voltage regulator 63 fluctuates somewhat, as the battery 33 potential varies somewhat, due to either the drainage by the various electrical circuitry, the run down condition of the battery 33, or resistive line drops, provided the voltage is still within the acceptable range. The reference voltage $V_S$ is the reference amplitude toward which C1 charges. In other words, the capacitor C1 charges toward a potential at which Q23 is caused to conduct and Q24 is turned off.

Restated the voltage amplitude variation of the voltage $V_S$ applied to the timing circuitry does not affect the timing function of the timing circuit; the capacitor is allowed to charge to the same precise predetermined time duration T, between T1 to T2 or T4 and T5 irrespective of the variation in the power supply.

When the time duration of the wheel decelerating at the rate exceeding the predetermined rate is less than the predetermined time period, T, e.g., 4 seconds, suppose for example, after 2 seconds the operator lifts the brake pedal 11, this causes the switch 41 to open and causes removal of the voltage from voltage regulator 63 at time T8. This removes the voltage $V_S$, that is, $V_S$ goes to zero. This causes Q11 and Q12 to conduct at time T8 before the time duration T is reached. The charged capacitor C1 is discharged through Q11 and Q12. In the meantime, the base potential at Q23 of the comparator never reaches the forward bias potential level, so Q23 does not conduct and thence no latch signal is generated.

Referring to FIG. 2, active element Q27 and the amplifier 72 is used to actuate the switch SCR 65 when the current drawn through the switch Q21 and diode D1 exceeds a certain predetermined amplitude. Once actuated, the SCR or some other suitable switching means causes the fuse 43 to blow and this removes the power applied to the anti-skid circuitry not allowing the malfunction to disable the brakes any longer.

Various modifications and changes may be made to the aforementioned inventive fail-safe circuitry of an anti-skid control circuit for a brake system without departing from the spirit and scope thereof.

What I claim is:

1. In the anti-skid control apparatus for an automobile brake system adapted to operate with the brake system of an automobile and prevent it from skidding with an actuable valve operatively coupled to a brake shoe for applying brake force against a wheel of the automobile in motion to slow it down and an anti-skid control circuitry controlling the operation of the actuable valve for applying brake forces against the wheel in a controlled manner to avoid skidding, said anti-skid control circuitry including means for sensing the rate of deceleration of the moving wheel and providing an output signal when the rate exceeds a predetermined rate indicative of skidding conditions and means for deactuating the valve to release the brake shoe in response to the output signal to prevent skidding, the improvement which comprises fail safe circuitry for actuating the valve when the brake shoe is released by said anti-skid control circuitry for a predetermined time period whereby the brake shoe is prevented from being released for more than said time period, said fail safe circuitry including an R-C timer adapted to have applied thereto a regulated voltage, said timer including a timing capacitor coupled to the regulated voltage and through additional circuitry providing an actuating signal to the valve when the voltage stored in said timing capacitor reaches a predetermined value, and semiconductor means coupled across said timing capacitor for discharging said capacitor before the voltage stored therein reaches the predetermined value when the regulated voltage dips below a predetermined amount.

2. Fail safe circuitry as claimed in claim 1 wherein the timer further includes a resistor adapted to be connected to the regulated voltage and to the additional circuitry for adjusting the predetermind value of voltages in accordance with fluctuations of the regulated voltage and for operating to control and time the discharge of the timing capacitor once the predetermined value of voltage has been reached.

* * * * *